US012030222B2

(12) United States Patent
Felisari et al.

(10) Patent No.: US 12,030,222 B2
(45) Date of Patent: Jul. 9, 2024

(54) CIRCUIT AND PROCESS FOR MANAGING TRANSIENTS IN A PLANT FOR CONTINUOUS MASS PRODUCTION OF GRANULATED EXPANDABLE POLYMERS

(71) Applicant: VERSALIS S.P.A., San Donato Milanese (IT)

(72) Inventors: Riccardo Felisari, Mantova (IT); Sara Gavioli, Revere (IT); Riccardo Inglese, Stiviere (IT)

(73) Assignee: Versalis S.P.A., Milanese (IT)

( * ) Notice: Subject to any disclaimer, the term of this patent is extended or adjusted under 35 U.S.C. 154(b) by 0 days.

(21) Appl. No.: 16/958,207

(22) PCT Filed: Dec. 21, 2018

(86) PCT No.: PCT/EP2018/086492
§ 371 (c)(1),
(2) Date: Jun. 26, 2020

(87) PCT Pub. No.: WO2019/129686
PCT Pub. Date: Jul. 4, 2019

(65) Prior Publication Data
US 2020/0346368 A1    Nov. 5, 2020

(30) Foreign Application Priority Data

Dec. 27, 2017 (IT) .................. 102017000149724

(51) Int. Cl.
*B29B 9/06* (2006.01)
*B29B 9/12* (2006.01)
(Continued)

(52) U.S. Cl.
CPC ............... *B29B 9/065* (2013.01); *B29B 9/12* (2013.01); *B29C 48/0022* (2019.02);
(Continued)

(58) Field of Classification Search
CPC ....... B29B 9/065; B29B 9/12; B29C 48/0022; B29C 48/04; B29C 48/269; B29C 48/92;
(Continued)

(56) References Cited

U.S. PATENT DOCUMENTS

| 3,544,525 A | 12/1970 | Balint et al. |
| 4,213,747 A | 7/1980 | Friedrich |

(Continued)

FOREIGN PATENT DOCUMENTS

| CN | 1196995 A | 10/1998 |
| CN | 101405122 A | 4/2009 |

(Continued)

OTHER PUBLICATIONS

International Search Report dated Feb. 18, 2019 for PCT application No. PCT/EP2018/086492.

(Continued)

*Primary Examiner* — Seyed Masoud Malekzadeh
(74) *Attorney, Agent, or Firm* — Ruggiero McAllister & McMahon LLC

(57) ABSTRACT

Circuit and to a process for managing transients and process and product anomalies in a plant for production of granulated expandable polymers EPS or extruded polymers XPS, said circuit being placed e.g. in a granulation plant along which are positioned:

a mixing device suitable for mixing additives and expanding agent within a stream of molten polymer;

a granulator or an extrusion device positioned downstream of said mixing device;

a deviation valve suitable for molten polymers placed along the line connecting said mixing device to said granulator or to said extrusion device upstream of said granulator or extruder, said deviation valve being provided with at least one inlet (A), a Stand-by position (A→C) and a Run position (A→B), (Continued)

said circuit further comprising a heating device downstream of said valve, a separation device downstream of said heating device suitable for physically separating the blowing agent from the polymer and any additives present therein, and a cooling device positioned between said separation device and said mixing device.

15 Claims, 5 Drawing Sheets

(51) Int. Cl.
- B29C 48/00 (2019.01)
- B29C 48/04 (2019.01)
- B29C 48/08 (2019.01)
- B29C 48/25 (2019.01)
- B29C 48/92 (2019.01)

(52) U.S. Cl.
CPC ............ B29C 48/04 (2019.02); B29C 48/08 (2019.02); B29C 48/269 (2019.02); B29C 48/92 (2019.02)

(58) Field of Classification Search
CPC .... B29C 48/0012; B29C 44/3461; C08J 9/16; C08J 2201/03; C08J 2325/08
See application file for complete search history.

(56) References Cited

U.S. PATENT DOCUMENTS

| | | | | |
|---|---|---|---|---|
| 4,385,016 | A * | 5/1983 | Gwinn | B29B 13/00 264/37.32 |
| 4,416,605 | A * | 11/1983 | Konno | B29B 7/488 425/185 |
| 4,612,355 | A * | 9/1986 | Belz | B29C 48/875 526/88 |
| 5,304,590 | A | 4/1994 | Merz et al. | |
| 5,605,937 | A | 2/1997 | Knaus | |
| 5,879,720 | A * | 3/1999 | Yoshida | B29C 48/05 425/313 |
| 6,369,192 | B1 | 4/2002 | Dufresne et al. | |
| 8,187,512 | B2 * | 5/2012 | Eloo | B29C 48/92 264/141 |
| 8,535,585 | B2 * | 9/2013 | Casalini | B29B 7/325 264/142 |
| 8,795,562 | B2 * | 8/2014 | Schmaus | B29B 9/065 264/141 |
| 9,248,585 | B2 * | 2/2016 | Takamoto | B01J 2/20 |
| 9,447,273 | B2 * | 9/2016 | Casalini | B29B 9/065 |
| 10,137,601 | B2 | 11/2018 | Huang et al. | |
| 10,183,264 | B2 * | 1/2019 | Felisari | B29C 48/29 |
| 2006/0211780 | A1 * | 9/2006 | Passaplan | B29B 9/065 521/60 |
| 2006/0233903 | A1 * | 10/2006 | Munz | B29C 48/38 425/225 |
| 2008/0249199 | A1 * | 10/2008 | Nising | C08J 9/16 521/40 |
| 2008/0296794 | A1 | 12/2008 | Lin et al. | |
| 2009/0108480 | A1 * | 4/2009 | Schmaus | B29C 44/3461 264/12 |
| 2009/0110833 | A1 * | 4/2009 | Wright | B29B 9/16 428/688 |
| 2009/0203840 | A1 * | 8/2009 | Martin | B29B 7/826 525/50 |
| 2010/0130627 | A1 * | 5/2010 | Casalini | C08J 9/224 521/59 |
| 2012/0076884 | A1 * | 3/2012 | Schmidt | A23P 30/20 425/308 |
| 2012/0084993 | A1 * | 4/2012 | Martin | C08F 6/005 264/141 |
| 2012/0108735 | A1 * | 5/2012 | Kluge | B29C 48/286 425/131.1 |
| 2012/0267818 | A1 * | 10/2012 | Eloo | B29C 48/92 264/141 |
| 2012/0299210 | A1 * | 11/2012 | Nising | B29C 48/345 425/305.1 |
| 2013/0062804 | A1 * | 3/2013 | Takamoto | B29C 48/919 264/141 |
| 2013/0345328 | A1 * | 12/2013 | Casalini | B29C 48/362 521/59 |
| 2014/0175695 | A1 | 6/2014 | Eloo et al. | |
| 2015/0063054 | A1 * | 3/2015 | Felisari | B29C 48/298 366/76.1 |
| 2017/0368716 | A1 * | 12/2017 | Zogg, Jr. | B29C 48/285 |
| 2020/0346368 | A1 * | 11/2020 | Felisari | B29C 48/269 |

FOREIGN PATENT DOCUMENTS

| | | | |
|---|---|---|---|
| CN | 101613426 | A | 12/2009 |
| CN | 101678565 | A | 3/2010 |
| CN | 103804980 | A | 5/2014 |
| CN | 106041316 | A | 10/2016 |
| CN | 106985300 | A | 7/2017 |
| EP | 739701 | A2 * | 10/1996 ............ B29B 17/02 |
| EP | 0 774 332 | A2 | 5/1997 |
| EP | 2578378 | A1 | 4/2013 |
| ES | 363300 | A1 | 12/1970 |
| JP | 2017-177550 | A | 10/2017 |
| RU | 2160749 | C2 | 12/2000 |
| WO | 03/053650 | A1 | 7/2003 |
| WO | 03/106544 | A2 | 12/2003 |
| WO | 2011092054 | A1 | 8/2011 |
| WO | 2011092250 | A1 | 8/2011 |
| WO | 20110092054 | A1 | 8/2011 |

OTHER PUBLICATIONS

Russian Office Action (with English translation) dated Feb. 8, 2022 for Russian Appl. No. 2020124677.

Russian Search Report dated Feb. 8, 2022 for Russian Appl. No. 2020124677.

De San Luis et al.; "Removal of Volatile Organic Compounds from Bulk and Emulsion Polymers: A Comprehensive Survey of the Existing Techniques", Ind. Eng. Chem. Res. 2019, 58, pp. 11601-11623.

Japanese Office Action (with English translation) dated Sep. 20, 2022 from Japanese Patent Appln. No. 2020-535221, 3 pages.

* cited by examiner

CIRCUIT AND PROCESS FOR MANAGING TRANSIENTS IN A PLANT FOR CONTINUOUS MASS PRODUCTION OF GRANULATED EXPANDABLE POLYMERS

CROSS REFERENCE TO RELATED APPLICATIONS

This application is a national stage application, filed under 35 U.S.C. § 371, of International Patent Application No. PCT/EP2018/086492, filed on Dec. 21, 2018, which claims priority to Italian Patent Application 102017000149724, filed on Dec. 27, 2017, the entire contents of each of which is incorporated by reference herein in its entirety.

Description

The present invention relates to a circuit and to a process for managing transients and process and product anomalies in a plant for continuous mass production of granulated expandable polymers (EPS) or extruded polymers (XPS) by extrusion.

The object of the present invention is to manage transients and anomalies reliably while minimizing time and material losses.

The circuit and process are applied in managing transient steps such as startup, shutdown, temporary interruption, interruption, and restart of granulation, and even more particularly when the granulation takes place by way of an underwater granulator, as described in WO 03/106544, or a spray granulator, as described in WO 03/053650.

Further, the process is applied in managing process for product anomalies that may occur in a plant for continuous production of granulated or extruded expandable polymers.

The described and claimed process is also applied in "swing" processes, which allow the production of expandable and non-expandable polymer granulates using the same plant.

"Continuous mass" production refers to all processes relating to preparing polymer in the molten state and subsequent treatment such as mixing with further additives, cooling the molten mass, and subsequent transformation into solid particulate. This last step may for example take place by granulation, which transforms the molten mass into solid granules (typically of size 0.3 to 2 mm for expanded polystyrene; 1 to 15 mm for non-expandable polymers), or by extrusion, which typically obtains extruded forms (XPS, extruded polystyrene) which are cooled and solidified downstream of the extrusion die.

For the purposes of the present discussion, the term "transients" refers to all process steps that are not fully operational, and in particular to startup, shutdown and any anomalies found during a production process that may affect both the process and the product.

For the purposes of the present discussion, the term "end device" refers to the granulator or extruder by means of which the molten polymer mass is cooled and solidified in the desired form (in other words, granules and extruded forms, respectively).

For the purposes of the present discussion, "capacity" refers to the volume of a container, for example, a receptacle, a tank, or similar devices.

For the purposes of the present discussion, unless indicated otherwise, percentages are by mass.

For the purposes of the present discussion, all operational conditions given in the text are to be understood as being preferred conditions even if this is not explicitly stated.

For the purposes of the present discussion, the term "comprise" or "include" also includes the term "consist of" or "substantially consist of".

For the purposes of the present discussion, the definitions of ranges always include the endpoints unless specified otherwise.

During continuous mass production of expandable polymers, the plant may be in transient operation.

Indeed, production requires a startup step for the process and a shutdown step.

Furthermore, various sets of problems may occur in metering the additives and the polymer, in regulating the flow rate, temperature and pressure, or in the granulation itself.

These transient steps lead to significant drawbacks, which are illustrated hereinafter.

For the production of expandable granules (EPS), the granulator may be started up only under clearly determined running conditions; in particular, it is typically necessary for the flow rate of the expandable polymer already to be within a predetermined range, for example at least 30% of nominal flow rate, or even at least 50% if underwater granulators are used, before the granulator can be supplied. Further, the temperature and pressure of the polymer melt entering the granulation die have to be aligned in advance with the required values for starting up the granulator. Likewise, the recipe has to be aligned with the target value; in particular, the expanding agent already has to be present in the polymer melt in the pre-established amount.

Otherwise, the startup of the granulator may turn out to be very problematic; for example, if the expanding agent is too low in quantity there may be a high pressure block since the expanding agent significantly reduces the viscosity of the molten polymer mass. or ineffective; for example, if all of the holes in the granulator die do not open.

Thus, it is not generally possible to start up the granulator when starting from an idle plant.

There is, therefore, a need to manage this transient step reliably while minimizing time and material losses. Therefore, in the initial steps, it is advantageous to prepare the polymer, transport it at the required flow rate, and add expanding agent and any other additives without using the granulator provided for granulating expandable polymers.

Furthermore, unplanned or scheduled shutdown of the plant may require the removal of expandable polymer in the molten state present therein. Indeed, some typically used additives, such as flame retardant agents and related synergistic agents, are thermolabile, meaning that they degrade and may also induce depolymerization of the polymer in which they are contained. Further, the expanding agent tends to mix and segregate when the flow rate is reduced below a particular value. Therefore, the expandable polymer mass contained in the molten state in the plant, after a shutdown, generally cannot be granulated and thus has to be managed in some other way.

For the same reasons, for both the startup and the shutdown of an extruded polymers (XPS) production plant, it is necessary to manage the polymer mass in some other way and to prevent it from reaching the extrusion die by means of which the desired solid manufactured goods are created.

For these reasons, a granulated expandable polymers production plant needs a secondary output out of which the polymer mass is passed in the molten state during startup, cleaning, and shutdown of the plant, preventing it from reaching the end device.

This output is generally implemented using a three-way valve, known as a "startup" valve, which deviates the entirety of the expandable polymer into the second output.

Typically, when conditions permit, after the plant starts up, the valve is deviated into the working position, rapidly transporting the entirety of the molten polymer mass towards the end device.

The expandable polymer mass exiting the second output is generally transported at atmospheric pressure and removed therefrom manually or by means of suitable mechanical apparatuses, forming blocks of various sizes that are cooled and solidified.

However, this solution has various drawbacks. Indeed, the polymer typically contains a highly inflammable expanding agent which, when brought to atmospheric pressure, brings about violent expansion of the product and a release of inflammable compounds into the atmosphere.

This expansion produces low-density, high-volume manufactured goods, which are very bulky for processing and storage, resulting in possible fire hazards.

If the expanding agent is recovered, for example by a capture system, it still ends up dispersed in a significant amount of air, making it very problematic to reuse, as well as to absorb on suitable means such as active carbon.

Finally, the expanded polymer exiting the second path, having become a voluminous, low-density mass, cannot easily be recycled into the process, causing a net production loss.

If the plant produces polymer by melting granules in an extruder, and of a limited size, the startup and shutdown thereof are relatively rapid. Therefore, the production of this waste during startup or shutdown may be manageable and the associated risks can be contained.

However, if the polymer comes directly from a production plant or if the plant is large, the startup and shutdown cannot be immediate, thus causing a significant increase in the production of waste and associated risks.

These drawbacks are particularly relevant for plants the provide production of polymer in line with the production process of expandable granulates since the startup and shutdown times also have to include the relatively slow step of polymerizing the monomer.

A very limited number of patent applications deal with the problems of transients in a vinyl aromatic polymers production plant.

WO 2011/092250 describes a method for starting up a production process for expandable vinyl aromatic polymer granules. The process uses granulators. The vinyl aromatic polymer containing an expanding agent is sent to a granulator until the flow rate thereof enters the operative range for the operation of the second granulator and until the proportions of expanding agent and any additives present are to specification.

The two granulators may act as a backup unit when problems occur which require shutdown, for example, for maintenance of one of the two. Thus, the method described in WO 2011/092250 does not provide an operation of removing the expanding agent before the granulation of the polymer melt.

EP 0774332 describes a process for granulating thermoplastic resins that is capable of continuous operation even when the viscosity of the polymer changes significantly. This is achieved using two granulation heads which operate alternately depending on the viscosity of the polymer. The patent does not provide an operation of removing an expanding agent before the polymer melt is sent for granulation.

US 2012/0267818 describes a granulation method that reduces the losses that can occur during startup or any intermediate interruptions. The method provides that a melt coming from a generator is sent to a plurality of granulation heads via a startup valve which has various operating positions. In particular, the granulators are of different sizes so that during startup, it is possible to use smaller granulators and then to switch to the larger granulators. In this way, it is possible to avoid interruptions and reduce waste.

WO 2011/092054 describes a plant for expandable plastics material granulates production. The plant provides a source of molten polymer, a device for impregnating the polymer with an expanding agent, and a granulator for obtaining the granulate from the expandable polymer. A switching device deviates the molten polymer in such a way that the molten polymer does not flow through the impregnation device. Instead, the molten polymer flows directly to the granulator. In this way, it is possible to granulate even in the absence of an impregnating agent while simultaneously avoiding dead zones where the non-flushed polymer can break down.

The polymer free of expanding agent and the impregnated polymer can be supplied independently to one of the two granulators since a rapid switching device makes it possible for each granulator to start up independently.

US 2008/249199 describes a process for treating particles of polymer that are loaded with a propellant and to form foamable particles specifically. In this process, the particles are melted in an extruder and the propellant is removed. Subsequently, additives are added in measured amounts to form a polymer melt comprising additives.

A further polymer melt is prepared, and a propellant is added. Subsequently, the two polymer melts are mixed in such a way that the additives and propellants are distributed homogeneously. The homogeneous melt is then cooled and granulated.

The solutions proposed in the art provide the possibility of using a second granulator, which may be used for startup if process or product problems occur. However, as described above, none have a device for removing expanding agent prior to secondary granulation.

Therefore, if the expanding agent has already been added and mixed, the secondary granulator should be able to granulate the polymer with the expanding agent. This poses critical issues since, as is known, the expanding agent is typically a mixture of hydrocarbons, more typically a mixture of pentanes, which greatly reduces the glass transition temperature of the polymer, thus making it granulatable only by greatly cooling the polymer itself before and during granulation. This cooling cannot be carried out if the polymer does not contain pentane since, in this case, the viscosity would be extremely high, and the pressure losses would be unacceptable. If there are process problems, the amount of expanding agent may not be known; thus, the granulation conditions also cannot be set.

Further, the granulation of an expandable polymer is much more problematic than that of a non-expandable polymer. Indeed, because of the increased compressibility of the polymer, dedicated granulation technology is required, in which the volumes are minimized so as to reduce the response time of the system. The granulator is kept at high pressures, up to 20 barg, to avoid pre-expansion of the granules and loss of the expanding agent. For safety reasons, the entire plant should be implemented in accordance with strict standards which significantly increase the investment and management costs. The storage of the granulate itself, which may contain large amounts of expanding agent, turns out to be critical.

The process according to the present patent application solves the aforementioned problems of the prior art.

Thus, one subject matter of the present patent application is a process for managing transients and process and product anomalies in a plant for the continuous mass production of granulated expanding polymers or extruded polymers which includes the following steps:
- deviating a part of a molten polymer mass, containing an expanding agent and any additives, before it is granulated or extruded;
- optionally heating the part of the molten polymer mass to a temperature greater than or equal to 160° C., in case the part of the polymer mass is drawn at a temperature less than 160° C.;
- removing the expanding agent from the molten, optionally heated, mass by operating at a pressure less than or equal to 5 absolute bar, and by physical separation of the expanding agent, forming a second molten polymer mass without an expanding agent;
- accumulating the second molten polymer mass in the system for possible subsequent reuse in the plant, or granulating or extruding the second molten polymer mass with suitable devices suitable for the purpose; and
- optionally, reusing the removed expanding agent in the plant.

A further subject matter of the present patent application is a circuit for managing transients and process and product anomalies, placed in a production plant of polymer granules or polymer extruded products, along which are positioned:
- a mixing device (35) suitable for mixing additives and expanding agent within a stream of molten polymer;
- a polymer granulator (39) or an extrusion device, positioned downstream of the mixing device (35);
- a deviation valve (38) suitable for molten polymers, placed along the line connecting the mixing device (35) to the polymer granulator (39) or to the extrusion device, upstream of the granulator or extruder; the deviation valve being provided with at least one inlet (A), a Stand-by position (A→C) and a Run position (A→B); the circuit being characterized in that it comprises a heating device (11) downstream of the valve, a separation device (13) downstream of the heating device, suitable for physically separating the blowing agent from the polymer and any additives present therein, and a cooling device (15) positioned between the separation device (13) and the mixing device (35).

Advantageously, in the described and claimed process, the expandable polymer is only ever brought into the atmosphere after correct granulation.

Advantageously, the expanding agent can be recycled into the process, reducing risks of explosion, greenhouse gas losses, and economic losses.

Advantageously, with the process according to the present patent application, it is possible to extend the startup and shutdown time as desired or to suspend production (stand-by) for an indeterminate time without encountering drawbacks such as the accumulation of material that cannot easily be resold or reused.

A further advantage is that the entire process can be carried out for an indefinite time, without the need to interrupt the upstream polymer reaction section. Therefore, during startup or stand-by, it is possible to adjust the recipe and to remove expanding agent and other additives from the plant. As a result, the described and claimed process is particularly advantageous for granulated expandable polymer production plants, which draw the polymer directly into the molten state from a continuous production plant.

Advantageously, the granulate obtained during the transient step is free of expanding agents and can easily be stored and reused.

Advantageously, the granulation plant may be conventional since it does not have to provide granulation with expanding agents which would make it necessary to use unconventional apparatuses since the expandable polymer becomes sticky and has a low viscosity and extremely high inflammability.

Advantageously, at the end of the transients, in other words when the deviation valve is deviated from the Stand-by position A→C to the Run position A→B, to resume the production of expandable polymer granules or expanded polymer sheets, there is a partial or total interruption to the drawing of expandable molten polymer, and in the meantime, it is formed into expandable polymer granules or expanded polymer sheets.

The described and claimed process is particularly advantageous if it is applied in processes where the expandable polymer is produced in the same plant or in an adjacent or connected plant or if the polymer is already being used in the molten state.

The described and claimed process is particularly advantageous if it is used in expandable polymers production plants that provide in-line production of the polymer used in the process, and more particularly for plants that provide in-line production of vinyl aromatic polymer.

The process makes it possible to manage the transient steps and the process and product anomalies of the process in a reliable, eco-compatible manner, in particular whilst minimizing or eliminating:
- direct manipulation of polymers in the molten state;
- emission of the expanding agents into the atmosphere;
- emission of and contact with toxic or caustic agents, such as in particular the brominated additives used to confer flame retardant properties, and the related degradation products; and
- the possibility of fires producing in the drained molten mass, linked to the fact that the expanding agent is nearly always a mixture of highly volatile, highly flammable hydrocarbons.

BRIEF DESCRIPTION OF THE DRAWINGS

Further aims and advantages of the present invention will become clearer from the following description and the accompanying drawings, which are provided merely by way of example and not by way of limitation, and which show preferred embodiments of the present invention.

Figure 1:
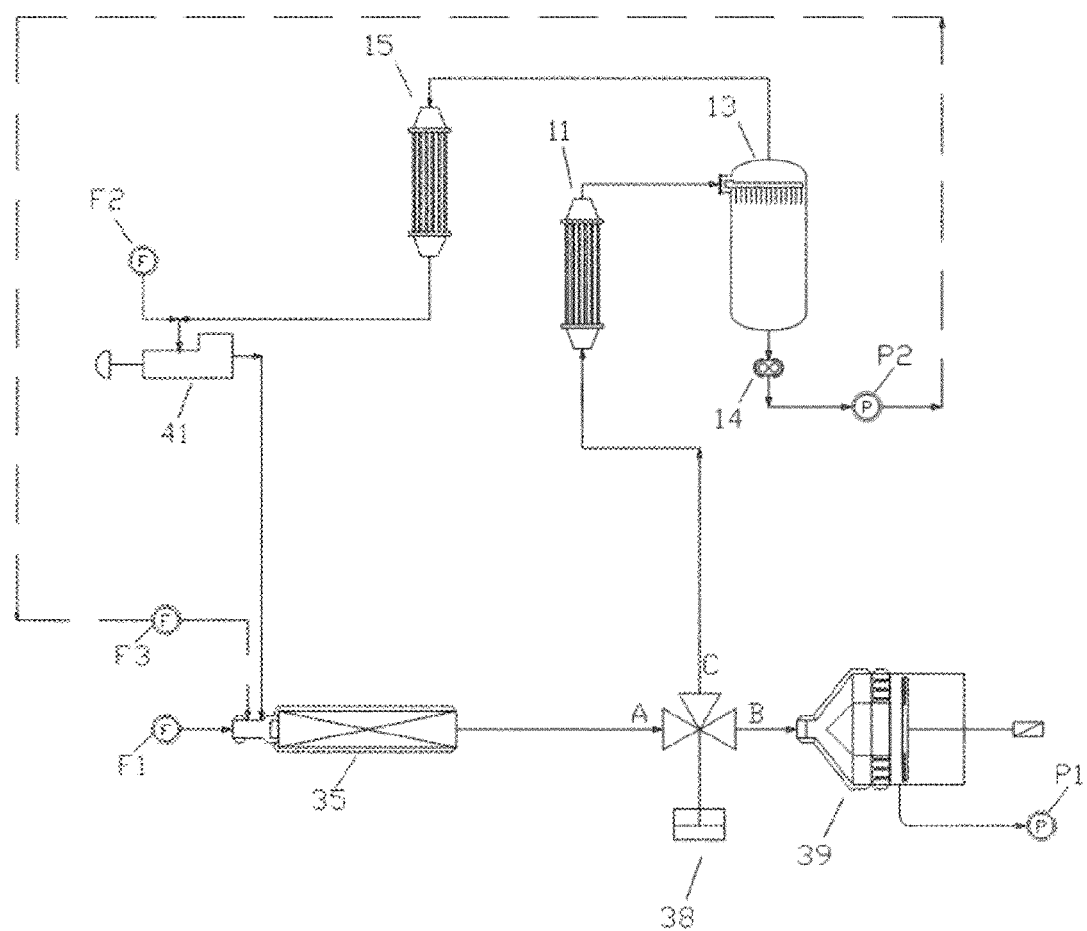
FIG. 1 shows a preferred embodiment of the process according to the present invention.

Hereinafter, the Applicant will describe the processes shown in the drawings.

DETAILED DESCRIPTION OF THE DISCLOSURE

The Applicant will now describe the process according to the present patent application in detail, whilst also referring to the accompanying drawings.

Typically, in processes for producing granulated expandable polymers or extruded polymers, a molten polymer mass is prepared, to which an expanding agent and, optionally, further additives are added. The mass thus obtained is mixed and, after it has been brought to a predetermined temperature and pressure, is supplied to a device for granulation or for extrusion in expanded forms (extruded sheets).

In both cases, the expandable polymer mass passes through a die before being granulated or extruded in expanded sheets.

As stated above, in processes for producing granulated expandable polymers or extruded polymers, both transient steps and product or process anomalies may occur.

The process according to the present patent application has the aim of managing the transients and anomalies in a reliable manner, whilst minimizing time and material losses in plants for continuous mass production of granulated expanded polymers or extruded polymers.

The described and claimed process takes place in a closed circuit for managing transients as described and claimed hereinafter.

In a closed circuit, one part of the molten polymer mass containing an expanding agent and optional additives is deviated by a deviation valve suitable for molten polymers before entering a granulation or extrusion device.

The molten polymer mass is optionally heated to a temperature T1 greater than or equal to 160° C. if the temperature of the mass is less than 160° C. The heating takes place in a heating device placed downstream of the deviation valve. After the optional heating, the mass of molten polymer is sent to a device for physical separation with the aim of removing the expanding agent from the molten mass. The separation operates at a pressure P2 less than or equal to 5 absolute bar, forming a second molten polymer mass free of expanding agent.

The second molten polymer mass is freed of expanding agent and accumulated in the plant for optional subsequent reuse, or granulated or extruded using appropriate devices suitable for the purpose.

If it is reused in the plant, the second molten polymer mass is mixed with the initial molten mass.

The removed expanding agent is optionally reused in the plant, after being cooled in a heat exchange device downstream of the separation device and integrated with a make-up.

The temperature T1 to which the molten mass of expandable polymer is heated may preferably be between 175° C. and 260° C., and may even more preferably be between 180° C. and 250° C., even more preferably between 190° C. and 230° C.

The separation may be carried out at a pressure P2 that is preferably less than or equal to 3 absolute bar, even more preferably between 0.01 absolute bar and 2 absolute bar, even more preferably at a pressure of between 0.05 absolute bar and 1.5 absolute bar.

The molten polymer mass comprising the expanding agent may advantageously be kept, prior to the physical separation, at a pressure higher than that of the device for the physical separation. Preferably, the pressure P1 is greater than or equal to 6 absolute bar, preferably greater than or equal to 10 absolute bar, or even more preferably between 15 absolute bar and 250 absolute bar, but in any case, less than or equal to 250 absolute bar. To achieve this difference, it may be advantageous to plan the separation device in such a way that the polymer undergoes a corresponding loss of pressure immediately prior to separation. For example, the separator may comprise a plurality of holes of a number, diameter and length such that, at the provided flow rate, the loss of load is equal to the pressure difference.

Further, an additional valve may be provided between the heating device and the separator, which allows the polymer comprising the expanding agent to maintain a predetermined pressure independently of the separation conditions, as described hereinafter.

The deviation valve has to be provided with at least one inlet position (A) and two outlet positions (B and C): a Stand-by position (A→C) and a Run position (A→B).

When the valve is in the Stand-by position, the molten polymer mass is directed to the heating device; by contrast, when it is in the Run position, the molten polymer mass is directed to a granulation or extrusion device.

In general, it is desirable to deviate the valve into the Stand-by position when there are problems in the granulation device or some other apparatus in the process that receives the granulated product, or when there are anomalous process conditions, such as high pressure of the polymer arriving at the granulator, a low flow rate of the water arriving at the granulator, a low pressure on the cutting blades of the granulator, or a low pressure in the granulation chamber.

Even during the plant's startup and shutdown, the valve is deviated into the Stand-by position and the molten polymer passes from the inlet position to Stand-by (A→C) whilst the Run outlet (B) is closed.

It is possible to deviate the valve manually or to implement a control system that automatically deviates the valve into the Stand-by position when alarm conditions are determined.

For the deviation to be effective, it is generally desirable for it to take place in a short time, typically in a time less than or equal to a minute.

Advantageously, the deviation valve may be equipped with a buffer which acts in such a way that the deviation action can always take place when required, even in anomalous plant conditions.

For example, the actuation may be hydraulic, in which case the hydraulic oil used for displacing the hydraulic cylinders is always kept pressurized in a dedicated capacity. In this way, even in the event of an unexpected malfunction of the pressurization pump, it is possible to carry out the deviation of the product towards the Stand-by position. Indeed, otherwise, if it were necessary to deviate the molten polymer mass and the hydraulic oil pump did not start, the deviation of the valve into Stand-by would not take place, and this could cause significant problems in the plant, as well as safety problems. Even if the polymer supply device (typically a gear pump) stopped, with the reduction in pressure the expanding agent contained in the polymer present in the pipework and apparatuses would expand, displacing large amounts of polymer out of the die. It is, therefore, advantageous to make sure that the deviator valve can deviate towards the Stand-by position in any eventuality.

In a preferred embodiment, a proportion of molten polymer mass, referred to as flushing, is continuously supplied towards the Stand-by position of the valve or downstream of the valve, even when this is aligned in the Run position. The flushing may comprise the expanding agent and additives but is preferably made with a polymer free of additives and expanding agent when available.

In the "static" mode of operation (or in all cases except the dynamic mode of operation referred to below), the proportion is typically less than 20% of the expandable molten polymer mass sent to the granulation or extrusion device, more preferably between 0.1% and 15%, even more preferably between 0.5% and 10%.

In the dynamic mode of operation described hereinafter, where the level of flushing is varied dynamically, during the rapid flushing the flow rate thereof may even reach 80% of the expandable polymer melt mass sent to the granulation or extrusion device.

The flushing may be implemented by way of a suitable configuration of the deviator valve, which places inlet A in communication with outlet C via an auxiliary conduit, even when it is aligned in position A→B (run position), or with a bypass conduit of the valve which places (A) in communication with (C); in the former case (auxiliary conduit), outlet (C) of the valve is also flushed, whilst in the latter case (bypass conduit) the flushing takes place from the point of insertion of the bypass, downstream of outlet (C). In an alternative, the flushing may also be implemented by drawing directly from the molten polymer mass entering the mixing device or before this device, this drawing subsequently being fed directly into (C) without the addition and mixing of expanders and any other additives.

A significant advantage of this option is that the separated polymer preferably does not contain additives, meaning that it can be reused without fear of it significantly altering the composition of the formulation.

Further, in this case, it is particularly simple and advantageous to regulate the amount of flushing polymer dynamically.

The mode of operation of dynamic flushing makes it possible to increase the flow rate of flushing soon after the valve is deviated into the Run position (A→B) to rapidly flush the expandable polymer towards the separator and thus limit the degradation thereof.

In this step, known as the rapid flushing step, the flushing flow rate may reach 90% of the normally produced expandable polymer mass supplied to the granulation or extrusion device, more preferably between 20% and 80% of the expandable polymer mass.

After the expandable polymer mass has been flushed, the flushing flow rate may advantageously be reduced so as to minimize the proportion of polymer mass the does not reach the granulation or extrusion device and that thus does not produce finished product. In this step, the amount of flushing is the same already indicated for the "static" mode of operation, or as indicated above at a proportion of between 0.1% and 15% of the produced expandable polymer.

The time typically required for rapid flushing is the time necessary to displace the product trapped in the apparatuses between outlet (C) (Stand-by) of the deviation valve and the granulation or extrusion device or the apparatuses for reuse of the product free of the expanding agent.

For the dynamic regulation, it is sufficient to apply, for example, a variable-speed pump to the flushing polymer between the inlet to the mixing device and outlet (C) of the deviation valve, for example a gear pump.

If expandable polymer mass has accumulated in a capacity, the pump may advantageously be arranged based on this capacity.

The flushing polymer, during operation with the deviation valve in the Run position (A→B), makes continuous slow flushing of the line possible, the line which carries the molten polymer mass towards the heating device in which the molten polymer mass is heated and towards the separation device. The continuous return of polymer into the line going from (C) to the separation device and pump prevents the polymer mass from degrading excessively over time even when the valve is kept in the Run position (A→B) for a long time. Since the degradation of the polymer generally leads to a reduction in the viscosity thereof, if the polymer which flows in the line between (C) and the base outlet of the separation device is not removed, it will not end up being granulatable and/or recyclable.

Therefore, flushing advantageously makes it possible to keep the deviation valve aligned in the Run direction for an indeterminate amount of time, preferably greater or equal to a month, thus making it possible to maximize the production of granulate or extrudate.

Surprisingly, the flushing has a further positive effect in that it facilitates the startup of the granulation of the expandable granulate.

Indeed, if the granulation starts up in the absence of flushing, it is often observed that the pressure in the die is higher, and it is more difficult to open all the holes of the die.

This phenomenon is particularly apparent where the startup of the granulation of the expandable granulate takes place after brief interruptions of production.

In other words, if the deviation valve has been constantly aligned in the Run position for a long time and is subsequently deviated into the Stand-by position to face some contingency, in the absence of flushing it will be difficult to resume the granulation without waiting for a minimum time period (for example at least one hour), in which the expandable polymer is passed from A to C.

Conversely, in the presence of the flushing, it is observed that it is not necessary to wait for the time period, and it is thus possible to resume granulation of the expandable granulate even after extremely short interruptions (i.e., by passing the expandable polymer aligned from A to C even for less than one minute).

Therefore, by applying the flushing, it is possible to interrupt sending the expandable polymer mass to the granulation or extrusion device, and thus to interrupt production and, when ready, to restart the flow towards the device so as to resume granulation of the expandable mass or production of extruded expanded sheets, at any moment and for any duration of the interruption to production (which may vary from a few seconds to several days).

In both cases, the flushing makes it possible to resume production of expandable granulate or expanded extruded sheets immediately.

Otherwise, however, it is typically necessary to carry out several startup attempts before obtaining a high-quality of granulation or extrusion with the necessary consistency in quality of the product obtained.

At the end of the transients, there is partial or total interruption to the drawing or deviation of expandable molten polymer mass, in that the deviation valve is deviated from the Stand-by position A→C to the Run position A→B, so as to resume production of expandable polymer granules or expanded polymer sheets.

At the end of the transient period, the time that passes between the interruption to the drawing of the polymer mass, in other words, the moment when the deviation valve reaches the Run position A→B again, and the formation into granules of expandable polymer or expanded polymer sheets, in other words the moment when the expandable polymer returns again to exit the die, is less than or equal to one minute, even more preferably less than or equal to 10 seconds, and even more preferably less than or equal to 3 seconds.

Optionally, there is a second drawing of the non-expandable molten polymer mass drawn before mixing with the expanding agent and any further additives which removes the expandable polymer mass which remains trapped in the apparatuses at the end of the transient. The second drawing in accordance with the first described dynamic mode of operation is optionally modulated over time in such a way that it is between 20 and 80% of the capacity of the expandable polymer mass for the time necessary to replace the product trapped in the equipment, and then reduced to a proportion of between 0.1% and 15% of the expandable polymer produced; or, in accordance with the previously described static mode of operation, kept at a constant proportion between 0.1% and 15% of the produced expandable polymer.

The granulated or extruded polymers free of expanding agent may be sold as is or may be recycled into the production process of the expandable polymers by melting (for example with an extruder) and subsequently injecting and mixing with the mass of expandable polymer in the molten state. Alternatively, they may be supplied directly to the molten mass already in the molten state prior to injection of the expanding agent. In the latter case, the molten polymer mass may be brought to an accumulation zone, such as the base of the devolatilizer of a polymer production plant.

The expanding agent may be removed from the device by physical separation and may be collected, for example, by means of a cooling device, such as a condenser connected to an accumulation zone below, so as to be reused in the production process of the expandable granulated compositions.

In the described and claimed process, the polymer mass may comprise the following polymers.

Thermoplastic polymers based on alkenyl aromatic compounds may preferably be present, more preferably homopolymers and copolymers of alkenyl aromatic compounds and unsaturated copolymerizable comonomers. The preferred copolymerizable comonomers include comonomers selected from butadiene; ethylene; vinyl acetate, maleic anhydride; (meth)acrylic acid; alkyl ester of (meth)acrylic acid in which the alkyl group contains 1 to 4 carbon atoms, more preferably selected from methyl acrylate, methyl methacrylate, ethyl acrylate, ethyl methacrylate, isopropyl acrylate, and butyl acrylate; amides and nitriles of (meth)acrylic acid, more preferably selected from acrylamide methacrylamide, acrylonitrile, and methacrylonitrile. The preferred copolymerizable monomers are selected from acrylonitrile, butyl acrylate, and methylmethacrylate.

In the described and claimed process, compositions of alkenyl aromatic compounds and non-alkenyl aromatic compounds may be present.

In the described and claimed process, one or more alkenyl aromatic homopolymers, one or more alkenyl aromatic copolymers, mixtures of one or more alkenyl aromatic homopolymers or copolymers, or mixtures of any of the above with a non-alkenyl-aromatic polymer may be present.

The alkenyl aromatic polymers suitable for the purposes of the present patent application include those derived from vinyl aromatic compounds, preferably selected from styrene, divinyl benzene, α-methyl styrene, ethyl styrene and bromostyrene; more preferably divinyl benzene, α-methyl styrene, and styrene.

Among the unsaturated compounds, compounds may be present which are selected from terpenes, acids and alkyl ester acids which can copolymerize with the vinyl aromatic monomers and can thus be used in the present process.

Typically, the resulting alkenyl aromatic or vinyl aromatic polymer has a weight-average molecular weight (MVV) of between 80,000 and 400,000, preferably between 100,000 and 260,000 daltons.

Other polymers, such as polyphenyl ether, may be added to the alkenyl aromatic or vinyl aromatic polymer to improve the mechanical rigidity or heat resistance of the polymer.

Polyphenylene oxide may preferably be present in the expandable polymer mass in a content of between 0.5% and 12%.

In the expandable polymer mass, random copolymers or copolymers having blocks based on aromatic vinyl may preferably be used, with these more preferably being selected from styrene-butadiene-styrene rubber, styrene-isoprene-styrene rubber, styrene-butylacrylate copolymer, high-impact polystyrene (HIPS), acrylonitrile-butadiene styrene (ABS), and styrene-acrylonitrile (SAN).

In the expandable polymer mass, polymers based on ethylene may preferably be used, more preferably ethylene vinyl acetate (EVA), polyethylene (PE), polybutyl terephthalate (PBT), or polyethylene terephthalate (PET).

In the expandable polymer mass, fragments of polymers used in the described and claimed process may be used, as well as milled materials of post-consumer products and beads of undesired expandable polystyrene (such as the undesired fractions resulting from the production process via suspension).

Conventional additives may be added to the polymers used in the described and claimed process. The additives are selected from chain-transfer agents, branching agents and nucleating agents. Typical chain-transfer agents include alkyl mercaptans, pentaphenyl ethane and methylstyrene dimer. Examples of branching agents are butadiene and divinyl benzene.

The additives supplied in the described and claimed process are any material suitable for being processed in a polymer melt. Typically, these additives include lubricants, plasticizers, hydrorepellents, antioxidants, nucleating agents, flame retardants, bromine stabilizers, and smoke suppressants. Some non-limiting examples are listed here:

elemental carbon, such as materials of graphite, carbon black, coke, in particular calcinated petroleum coke, anthracite, needle coke and graphitized coke, carbon nanofibres, vitreous carbon;

self-extinguishing agents such as compounds based on halogens, such as preferably hexabromocyclodecane, tetrabromobisphenol A bis (dibromopropyl ether), tetrabromobisphenol A bis (allyl ether), and brominated polymers, such as brominated styrene-butadiene block copolymers; or halogen-free compounds;

agents synergistic with self-extinguishing, in other words molecules having a labile bond of type C—C, such as 2,3-dimethyl-2,3-diphenylbutane; or of type O—O, such as peroxide and more particularly 3,6,9-triethyl-3,6,9-trimethyl-1,4,7-triperoxynonane or dicumyl peroxide; and inorganic derivatives or silicon, magnesium, aluminium, such as talc, silica, hydrotalcite, mica and the like; oxides and dichalcogenides of metals and semimetals.

Some of the additives listed above, such as talc, silica, hydrotalcite, mica, coke, graphite, carbon black, or graphene and graphene nanoplates do not melt at the temperature at which the molten polymer is present. The particles will be referred to hereinafter as unmeltable particles. Further, $D_{90}$ is defined by reference to the unmeltable particles, as the size below which 90% by volume of the total population of the unmeltable particles is found.

$D_{90}$ is measured by the static laser diffraction method (Malvern Mastersizer 2000) on a sample comprising the unmeltable materials in the same proportions used in the process.

The sample is dispersed in water, subjected to the action of ultrasound for 10 minutes, and subsequently sent to the measuring instrument (Malvern Mastersizer 2000). The algorithm used is Mie with the assumption of spherical particles and with application of a complex refraction index of 1.6 (real part) and 0.3 (imaginary part).

The $D_{90}$ of the unmeltable particles should not exceed half of the diameter of the holes in the die, and more preferably the $D_{90}$ should not exceed ¼ of the diameter of the holes in the die.

Expanding agents which may be used in the described and claimed process are hydrocarbon compounds having 3 to 7 carbon atoms, such as carbon dioxide, carbon monoxide, water, ethyl alcohol and ethyl ether. Of these, the hydrocarbon compounds having 4 to 6 carbon atoms are preferred.

Preferably, the expanding agent is used in an amount varying between 3% and 8% by weight, based on 100 parts by weight of granulated polymer.

Mixtures of expanding agents having various boiling points may also be used and have the advantage of promoting the foam's expandability.

A preferred embodiment of the process according to the present patent application will now be described, referring to FIG. 1.

A polymer in the molten state (F1) is prepared in an extruder, for example of the single-screw or twin-screw type, or directly in a production plant of the polymer (not shown in FIG. 1).

The molten polymer (F1) thus produced is supplied together with an expanding agent, via a suitable metering and pumping system (41), for example a piston pump or a membrane pump, to a mixing device (35). The device may be a static mixer, for example composed of a series of static mixers SMX produced by Sulzer, or it may be a dynamic mixer, such as a single-screw or twin-screw extruder.

Optionally, other materials (F3) may also be supplied to (35). For example, other polymers may be supplied, or polymer compositions including, in addition to the polymer, further additives such as polymer rheology modifier agents, nucleating agents, flame retardant agents, and athermanous additives. Further possible materials are a recycled polymer, which is produced from waste because it is out of specification and which may come from the same plant or from other productions.

Once it is mixed in (35), the polymer is brought to the deviator valve (38). The deviator valve (38) may be activated at any moment as required.

In general, it is desirable to deviate the valve into position C (Stand-by position) when there are problems in the granulator (39), or in any other apparatus which receives the granulated product (P1), or when there are anomalous process conditions, such as high pressure of the polymer arriving at (39), low flow rate of the water arriving at the granulator (39), low pressure on the cutting blades of the granulator (39), low pressure in the granulation chamber (39).

During startup and shutdown, the valve (38) is deviated into position C, and the molten polymer passes from position A to C, whilst outlet B is closed.

The mass of molten polymer may optionally be brought to the temperature and pressure required by the process before being mixed in (35) and before being granulated in (39).

For this purpose, pressurization (booster) pumps, such as gear pumps, and heat exchangers, such as mixer heat exchangers, may be provided.

When the valve is in the Stand-by position (C) the molten polymer mass is passed through a heat exchanger (11) which heats the mass and brings the temperature of the molten mass to a value such as to make possible subsequent removal of the majority of the expanding agent present therein; the removal takes place during the depressurization in the separation device (13), for example a devolatilizer.

The temperature of the expandable polymer melt arriving at (13) is greater than or equal to 160° C., and may preferably be between 175° C. and 260° C., and may even more preferably be between 180° C. and 250° C., and yet even more preferably be between 190 and 230° C.

In the devolatilizer (13), the expanding agent is separated from the heated polymer (11) whilst keeping the pressure in (13) at a level less than or equal to 5 absolute bar, preferably less than or equal to 3 absolute bar, even more preferably between 0.01 absolute bar and 2 absolute bar, and even more preferably at a pressure of between 0.05 absolute bar and 1.5 absolute bar.

It has been found that it is advantageous to keep the polymer in (11) at a pressure higher than that in (13). Preferably, the pressure in (11) is greater than or equal to 6 absolute bar, preferably greater than or equal to 10 absolute bar, and even more preferably between 15 absolute bar and 250 absolute bar.

The pressure drops between (11) and (13) may consist of a narrowing, which is concentrated (such as a valve) or distributed (for example pressure drop in the transfer tube or, if the devolatilizer (13) comprises a distributor, in the distributor itself).

It is advantageous to keep the devolatilizer (13) heated using a jacket or other heating system, especially the base thereof.

It is further found that, to avoid pressure peaks when (38) deviates into C, it is advantageous to keep the distributor heated by thermal insulation lining, a thermal oil jacket, electrical resistance, or another mode of operation known in the art.

The gases extracted from the devolatilizer (13) pass through a condenser (15) where the condensation of the expanding agent is carried out.

In the devolatilizer (13) or in the condenser (15), a nozzle may be installed from which the non-condensable gases bleed, such as the air initially present in the gaseous phase, or other potential non-condensable substances present in the expandable polymer. In this case, the extracted non-condensable gases may optionally pass through other devices commonly used in the art, such as active carbon drums, suitable for preventing dispersion of the expanding agent or of other toxic chemical species into the environment, or they may pass through one or more hydraulic guards or other pressure regulation devices such as regulation valves placed in feedback with respect to the pressure recorded in (13).

It is found that the use of a hydraulic guard is particularly advantageous because when the mass of expandable molten polymer arrives in (13), there may be an unexpected rapid production of vapours of the expanding agent with a subsequent increase in the pressure in (13) and (15). If the pressure overcomes the head of the hydraulic guard, the hydraulic guard immediately allows the vapour to pass through, thus preventing the desired pressure from being exceeded in (13) and (15), which would otherwise be detrimental to the proper operation of the system for removing the expanding agent.

The gases leaving (13) before arriving in (15) may optionally pass through traps to separate any liquid transported by the gas. Separators may also be used, optionally preceded by a cooling heat exchanger, to condense and separate any components present in the expandable polymer mass that have a condensation temperature greater than that of the expanding agent. These components are typically oligomers and monomers present in the molten polymer mass or other low-boiling additives introduced into it.

The expanding agent condensed in (15) may be collected in a capacity so as subsequently to be reused in the process via the pump (41) as an alternative to, or in combination with, the make-up expanding agent F2.

The polymer free of expanding agent is collected from the bottom of the devolatilizer (13). From there it can be recycled into the process (F3) via a pump (14), directly in the molten state.

Alternatively, the molten polymer (P2) may be granulated, for example using a spaghetti cutter or a water ring granulator, underwater granulator or spray granulator. The granules thus obtained can be reused in the process, for example, by melting in a suitable single-screw or twin-screw extruder or sold as is.

In the present text, the phrase "free of expanding agent" refers to a polymer in which the expanding agent has been reduced by at least 80% in weight in terms of the granulated expandable polymer, more preferably at least 90%, even more preferably at least 95%, based on the amount of expanding agent by mass contained in the expandable polymer supplied to the granulation or extrusion device. In the same way, for the purposes of the present invention, "removing the expanding agent" means reducing the amount of expanding agent contained in the polymer in the quantities stated above.

As stated, during the startup of the process, the valve (38) is in the Stand-by position (C). Subsequently, the polymer recipe is prepared with the desired features, by further supplying any other additives and the expanding agent to F1 via the pump (41). When the flow rate of the molten polymer mass, the recipe, and the temperature and pressure profiles have stabilised around the values provided for operation, the valve (38) is deviated, causing the molten mass to pass from position C (Stand-by) to position B (Run).

The device (39) may be any apparatus known in the art capable of producing expandable solid particulate, or a particulate in which at least 80% by weight of the expanding agent is kept within the composition, or capable of producing an expanse, such as a drawing device for extruded polystyrene (XPS), and in which the residual expanding agent is typically less than 50%.

In the first case, the device is typically a spaghetti cutter, or more preferably, a cutter under a head of liquid (underwater granulator) or a cutter having cooling brought about using a liquid spray (spray granulator).

In an underwater or spray system, the valve (38) may correspond to the startup valve which is required for starting up the granulator.

To start up an underwater or spray granulator, the expandable composition, initially in Stand-by (C), is deviated into the Run position (B), to bring about the purge in the die. This purge is necessary so as to fill the entire cavity of the die with the expandable polymer, in such a way that, upon the subsequent startup, the holes in the die, which are already full of polymer, can immediately extrude polymer before the cooling fluid, typically water, can freeze them.

Once the purge is carried out, the supply of the molten polymer is interrupted by deviating the start-up valve towards Stand-by (C). Subsequently, following a predetermined scheme, the die is cleaned of the polymer, the granulator is closed, it is started up, the blades are laid against the surface of the die, and the polymer is deviated towards the die by bringing the valve (38) back into the Run position (B), whilst the cooling fluid is directed into the granulator at a predetermined time slightly advanced or delayed with respect to the deviation of the valve (38).

If the startup of the granulator has been successful, the molten polymer will continue to flow from A towards B, and the expandable granulates will be produced. Meanwhile, in the event of any anomaly, for example in the presence of polymer blocks of various sizes, blockage of the discharge of the granulator (with a resulting increase in pressure therein), detachment of the blades from the die, freezing of the holes in the die (with a resulting increase in the pressure of the polymer beyond a predetermined alarm value), it will be necessary to interrupt the granulation.

In a traditional setup, this would involve deviation of the startup valve in the purge direction, followed by a necessary rapid stopping of the flow of polymer, expanding agent and any other additives, to prevent large amounts of inflammable material, which is difficult to recycle (since it is not granulated), into the atmosphere. Further, it should be noted that the presence of expanding agent has the effect of greatly swelling the polymer that is purged. Therefore, very large volumes of expanded material, which is difficult to manage, are generated.

Deviating the expandable polymer towards another (alternative) granulator for expandable polymers is equally critical. For example, if the problems encountered are due to the composition of the polymer, for example due to an anomalous high content of expanding agent which lowers the viscosity and makes the polymer to be cut even more sticky, they would also be replicated in the alternative granulator.

However, if it cannot granulate in either of the two granulators, the plant has to be shut down. This involves a long shutdown time, since the metering of all the additives, and in particular the metering of the expanding agent, has to be stopped.

If the expanding agent is composed of a mixture of hydrocarbons, such as a mixture of n-pentane and isopentane, the metering thereof should be gradual, and thus requires time.

Indeed, the expanding agent influences the rheology of the polymer, in particular also reducing the viscosity thereof by an order of magnitude.

Further, if the polymer comes from an in-line polymerization plant with a polymer production plant, stopping the latter would inevitably involve stopping the former. Stopping and resuming the polymerization reaction typically requires a very long time, especially considering the time necessary to stabilise the quality of the product obtained.

In the described and claimed process, however, it is not necessary to interrupt the flow of the polymer, expanding agent, and additives. Nor is it necessary to modify the formulation of the expandable polymer, nor the flow rate of the flushes.

Once it has been deviated from A towards C, the molten polymer mass passes through a heat exchanger (11) and is subsequently devolatilized in (13). The molten polymer mass, free of expanding agent, is accumulated either in the devolatilizer (13) or in another capacity. Passing through the heat exchanger is optional if the temperature of the molten polymer mass is already at the previously described temperature T1. Indeed, in this case, it is possible for the molten polymer mass to be sent directly from C to the devolatilizer (13) or to another capacity.

When it is desired to reuse the generated material, the pump (14), which recycles the molten mass free of expanding agent, may be directed towards the mixing device (35) again, or the molten mass may be sent to a conventional granulator for non-expandable granulates (such as a granulator with spaghetti cutter, an underwater granulator or a spray granulator). These granulates may subsequently be sold or reused in this or other processes.

Independent of the granulation of the non-expandable composition, when the problems that had caused the interruption to the granulation are resolved, the deviation of A towards B (Run position) can be brought about again so as to resume the extrusion of XPS or bring about the bleeding before the granulator (39) is restarted. This may be brought about without even slightly modifying either the formulation or the flow rate of the composition, so there is no need for adjustment, greatly reducing the time necessary for startup.

The mode of operation just described may be applied to both short interruptions and long interruptions, even interruptions of weeks, thus making the described and claimed process particularly flexible and effective.

Figure 2:
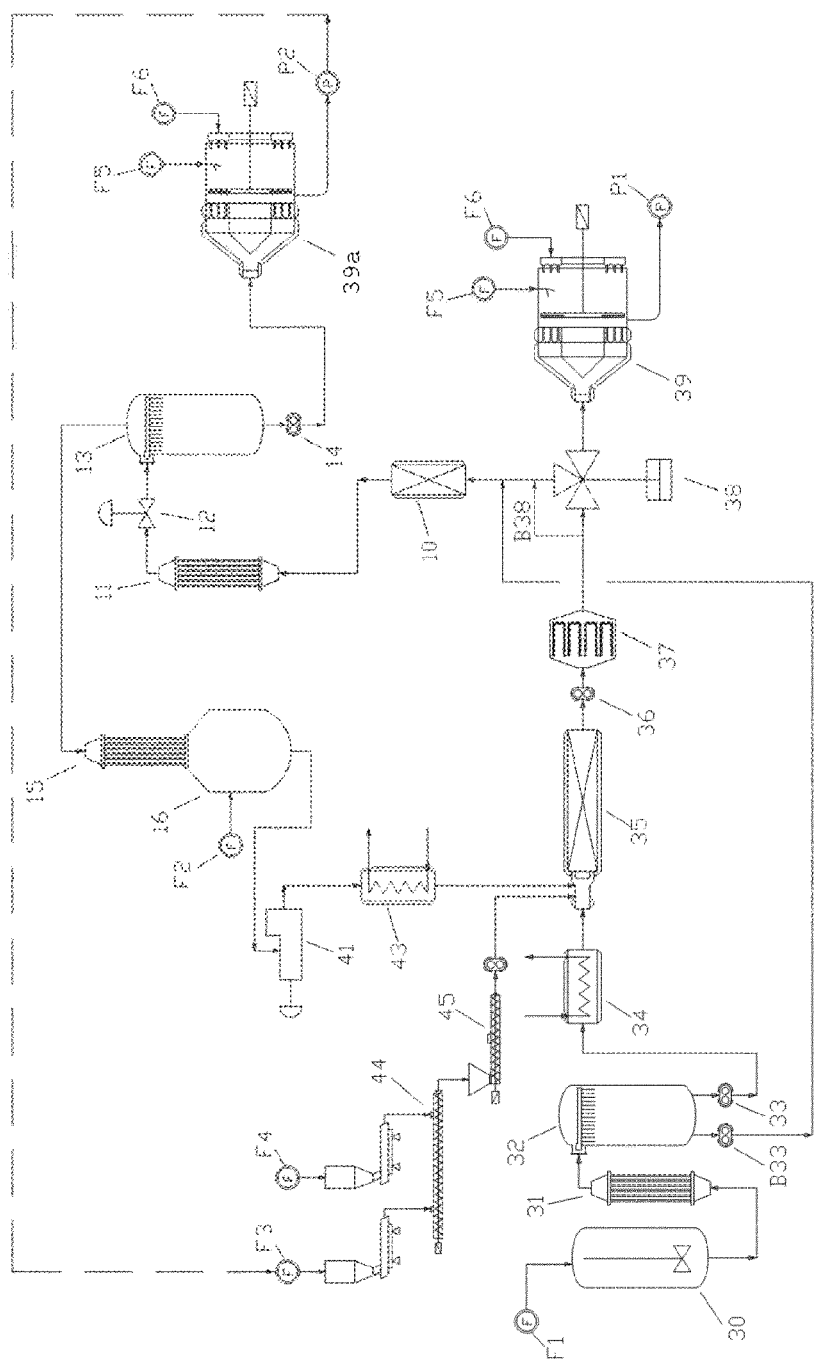
FIG. 2 shows a preferred embodiment of the process according to the present invention, with continuous in-line production of the polymer and recycling of the non-expandable granulated polymer.

A further preferred embodiment according to the present invention is illustrated in FIG. 2.

FIG. 2 descries an expandable granulates production plant with recycling of the non-expandable polymer in the form of granules, in line with and thus linked to a plant for producing the starting polymer.

The molten polymer (F1), coming from the polymerization reactors (30), is heated in (31) to remove the solvent and the unreacted monomer in the devolatilizer (32). The collection volume of the polymer of (32) may advantageously be used as temporary storage capacity, so as to make it possible for the plant upstream and downstream to start up and shut down independently. The pump (33) supplies the polymer accumulated in (32) towards the expandable granulates production plant. Even though a single devolatilizer (32) is shown, more devolatilizers may be used in series, so as to minimize the residual monomer in the polymer. In this case, the polymer is extracted from the final devolatilizer from (33) and (B33).

The polymer production plant may advantageously, but not necessarily, be located in the vicinity of the expandable granulate production plant. The capacity from which the molten polymer to be used in the expandable granulates production plant is extracted is not necessarily the devolatilizer (32). For example, a heated tank may be provided which acts as storage for the molten polymer, and which is supplied from the polymer production plant and supplies the expandable granulates production plant.

In each case, the devolatilization (32) may also supply a cutting line for the production of non-expandable granulates, exploiting the pump (33) or other dedicated pumps connected thereto.

The polymer coming from (32) is mixed with the other additives and the expanding agent in the mixing device (35). In a heat exchanger (34), the polymer melt is brought to a temperature suitable for the subsequent mixing operation.

For example, in the case of an expandable vinyl aromatic resins production plant, the temperature at outlet of the devolatilizer may be greater than 170° C., preferably between 180° C. and 250° C., even more preferably between 190° C. and 240° C. The heat exchanger (34) may bring this temperature below 210° C., preferably between 160° C. and 200° C.

The additives are supplied via suitable metering devices (F4) in the screw conveyor (44), together with recycled granulated polymer (F3) free of expanding agent. The mixture thus obtained in (44) is supplied to the extruder (45), so as to create a mass in the molten state which is pumped towards the mixer (35).

The fresh expanding agent F2 is supplied to a storage capacity (16), which may also act as a storage capacity for the condensate coming from the condenser (15), and from there pumped via the pump (41) towards the mixer (35).

Between the supply pump (41) and the mixer (35), an exchanger (43) is placed so as to preheat the expanding agent before bringing it into contact with the composition in the molten state. This prevents the polymer composition in the molten state from freezing on contact with the cold expanding agent, thus facilitating the mixing.

In (35), all of the materials are mixed so as to form the expandable composition. Along the process, one or more booster pumps (36), placed, for example, downstream of the mixer (35), and filtering systems (37) may be provided. Advantageously, the filtering systems used, especially if they are placed before the deviation valve (38), make it possible to change the filter without interrupting the flow of polymer through them.

Examples of filtering systems of this type include continuous filters, in which the filtering element is continuously or intermittently renewed, or multiple filtering systems, in which, at the moment when a filtering element is changed, the other filtering elements of the filtering system can remain operative.

The deviation valve (38) can deviate the expandable composition towards the device (39) (Run position) or towards the recycling (10, 11, 13) (Stand-by position).

The granulator (39) may be any granulator for expandable resins or a die for extruded polystyrene (XPS).

If (39) is an underwater-type granulator for expandable resins, a supply of a liquid coolant, typically water, is further provided in (F6). If it is of the water spray type, a supply of a gas that keeps the granulation chamber unflooded, typically nitrogen, is provided in (F5). The granulated expandable product is collected in (P1).

Before reaching the deviation valve (38), the expandable polymer composition can be thermally reconditioned using a suitable heat exchanger or equivalent system to bring its temperature to the optimum value for the subsequent granulation step (39).

In the Stand-by position, the expandable composition is brought towards the expanding agent removal system (11, 13). Advantageously, but not necessarily, before reaching the system, it is passed through a pressure drop regulation device (10). The device causes the pressure upstream of the valve (38), when the valve (38) is deviated into the Stand-by position, to be substantially the same as that of the polymer when the valve (38) is deviated into the Run position.

Indeed, it is found that this facilitates the startup of the granulator (39), in particular preventing the polymer from freezing in the holes in the die.

The device (10) may be any device useful for producing pressure on a polymer flow in the molten state, such as a static system. The static system typically uses friction as a method to cause pressure drop. The pressure drop may be concentrated, for example, using valves, or distributed, for example a pipe of section and length such as to ensure the required pressure drop, or more pipes in parallel, to maximize the friction area. For this purpose, static mixing elements may also be used. A mixed pressure drop system may further be used, which uses both concentrated and distributed pressure drop elements.

As described above, to keep the polymer circuit functioning towards the expanding agent removal system (11, 13), it is advantageous to provide flushing thereof with a small amount of polymer when the valve (38) is deviated into the Run position.

The flushing may be implemented by bypassing the valve (38) or by drawing an amount of expandable composition (B38) upstream of the valve (38) even when it is in the Run position.

Alternatively, for the flushing, non-expandable polymer drawn directly from the final devolatilization stage (32) by way of the pump (B33) may be used.

Advantageously, the flow rate of B33 may be kept variable, so as to regulate the flushing as required. In particular, it may happen that the molten polymer mass comprises additives which can degrade the polymer, known as critical additives, described in embodiment 4), and that these additives are present in the line used for removing the expanding agent (10, 11, 12, 13, 14). This situation may occur when, for any reason, the valve (38) is deviated into the Stand-by position while the molten polymer mass arriving at the valve contains the additives. In this case, it is found to be particularly advantageous to increase the flow rate of the pump B33 for the time required to eliminate the polymer containing the additives, and simultaneously not to recycle the product P2 containing the additives.

During this operation, the flow rate of the polymer coming from B33 may be significantly higher than the normal flushing rate, even being capable of reaching 100% of the flow rate arriving at the granulator (39), more preferably between 20% and 80% of the flow rate.

Operating in this way, it is found that it becomes possible to run the system without degradation of the molten polymer mass.

In both flushing scenarios (B38 or B33), the injection point of the flushing is preferably within the deviator valve (38); alternatively, the injection point may be immediately downstream of the valve or after the depressurization device (10).

The flushing is typically at least 0.25% with respect to the flow rate by weight of the granulated expandable polymer current in (39), preferably at least 0.5%, even more preferably between 1% and 20%.

To remove the expanding agent, the polymer melt mass is heated in the heat exchanger (11) before passing to the devolatilizer (13).

Before entry to the devolatilizer (13), a further pressure drop system (12) may be placed, such as a valve, which ensures that the composition is substantially monophasic when it passes through the heat exchanger (11).

The gases extracted in (13), containing the expanding agent, are condensed in (15) and collected in the receiving capacity (16). From here, the expanding agent can be recycled into the process via the pump (41).

Meanwhile, the polymer that is free of expanding agent is collected in the capacity of the devolatilizer (13), and if necessary, drawn from the pump (14) so as to be sent to the granulator for non-expandable compositions (39a), which may optionally make use of a cooling fluid F6 and a gas F5, depending on the granulator type.

The granulate (P2) may be collected and sold as is, or recycled into the process, for example by supplying it using the metering device for granules F3, which was discussed previously above.

In a variant of the process illustrated in FIG. 2, the fresh expanding agent F2 may be supplied directly to the mixer (35), thus being kept independent of the expanding agent recycling circuit (16, 41).

Figure 3:
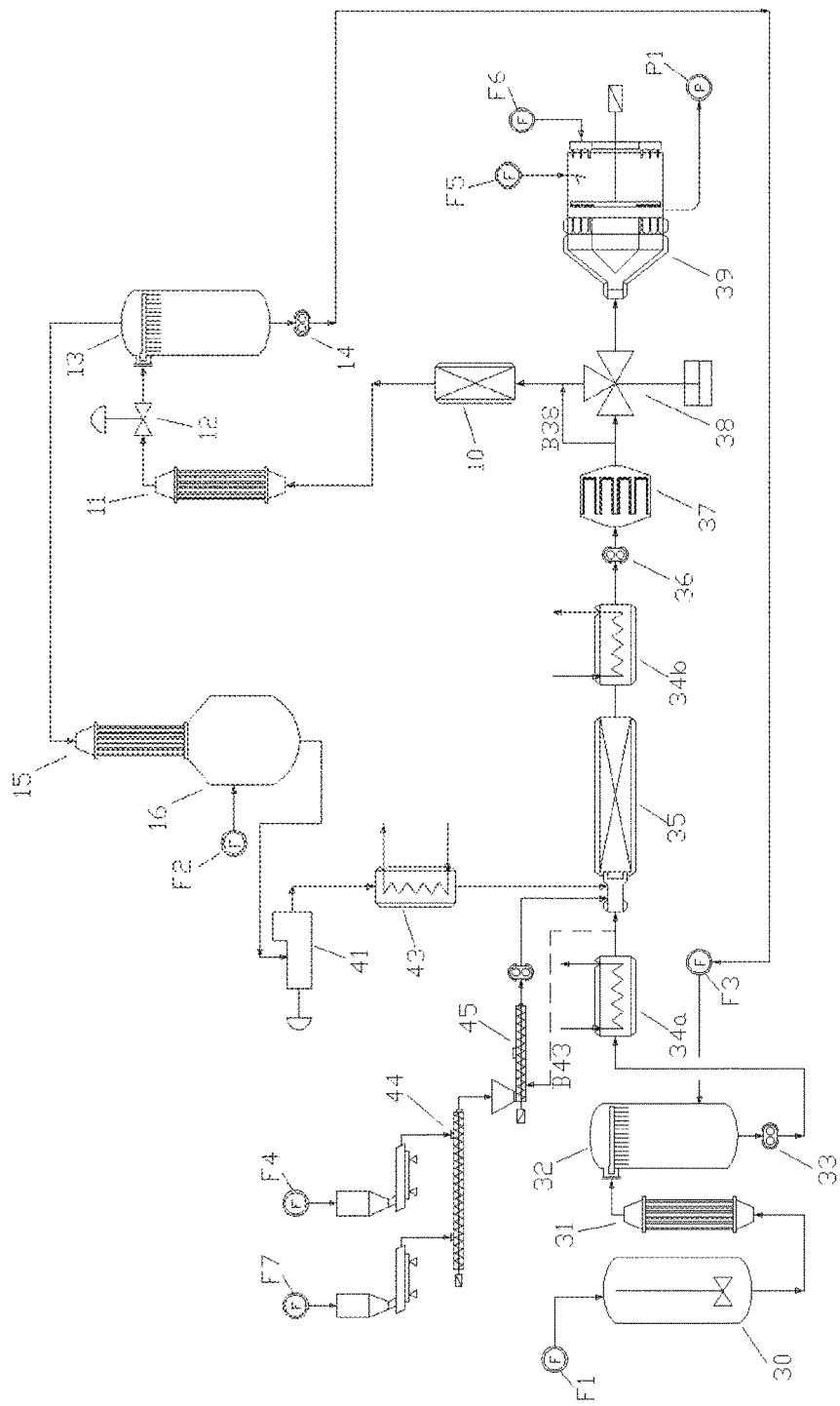
FIG. 3 shows a preferred embodiment of the process according to the present invention with continuous in-line production and recycling of the non-expandable molten polymer.

FIG. 3 illustrates a preferred embodiment according to the present invention. FIG. 3 describes an expandable granulates production plant with recycling of the molten non-expandable polymer in line with and thus connected to a plant for producing the starting polymer.

The embodiment of FIG. 3 is very similar to the embodiment of FIG. 2, to which reference is made for the description of the identical components.

Referring to FIG. 3, the granulate F7 supplied to the screw conveyor (44) is fresh polymer which is optionally used if it is necessary to add polymer to make the additives (F4) extrudable in a polymer melt. For example, if the additives are inorganic powders, it is typically necessary to add 50% by weight of polymer to cause the extruder (45) to be capable of implementing a polymer flow. Further, this promotes the movement of the powders, minimizing any "environmental hygiene" problems.

Alternatively, if the extruder (45) is an extruder capable of receiving polymer which is already in the molten state, the polymer required for this purpose may be drawn directly from the devolatilizer (32), still in the molten state. Optionally, all of the polymer produced and devolatilized in (32) may be brought to the extruder (45), for example by deviating the outlet of the exchanger (34a) towards the extruder (45) as shown in the dashed line (B43). In this case, the mixer (35) only receives the molten composition coming from the extruder (45) and the expanding agent coming from the pump (41).

The composition free of the expanding agent F3 is drawn from the devolatilizer (13) via the pump (14) which brings the polymer towards a receiving capacity from which the polymer required for producing the expandable granulates is extracted. Advantageously, this receiving capacity may be that of the devolatilizer (32).

The molten polymer coming from the devolatilizer (32) is sent from the pump (33) to the heat exchanger (34a), with an equivalent functionality to the exchanger (34) of FIG. 2.

Subsequently, the additives and the expanding agent are added, and everything is mixed in the mixer (35). Downstream of the mixer, a further heat exchanger (34b) is placed, which brings the mixture to the granulation temperature (39). For example, for cutting expandable granulates based on expandable polystyrene of the vinyl aromatic type, the temperature of the molten expandable composition leaving the heat exchanger (34b) may be between 160° C. and 200° C., more preferably between 170° C. and 190° C. By way of further example, for extruding extruded polystyrene (XPS), the required temperature may be between 100° C. and 170° C., preferably between 110° C. and 150° C.

The heat exchangers (34a) and (34b) may be static (in other words free of moving parts) or dynamic. Examples of dynamic heat exchangers are single-screw extruders in which both the screw body and the barrels of the extruder are heat-controlled to the desired temperature. Dynamic exchangers are generally advantageous if the degree of cooling is significant and, if at the target temperature, the viscosities of the melt are very high (for example greater than 1000 Pa·s), such as for the aforementioned extrusion of XPS.

Figure 4:
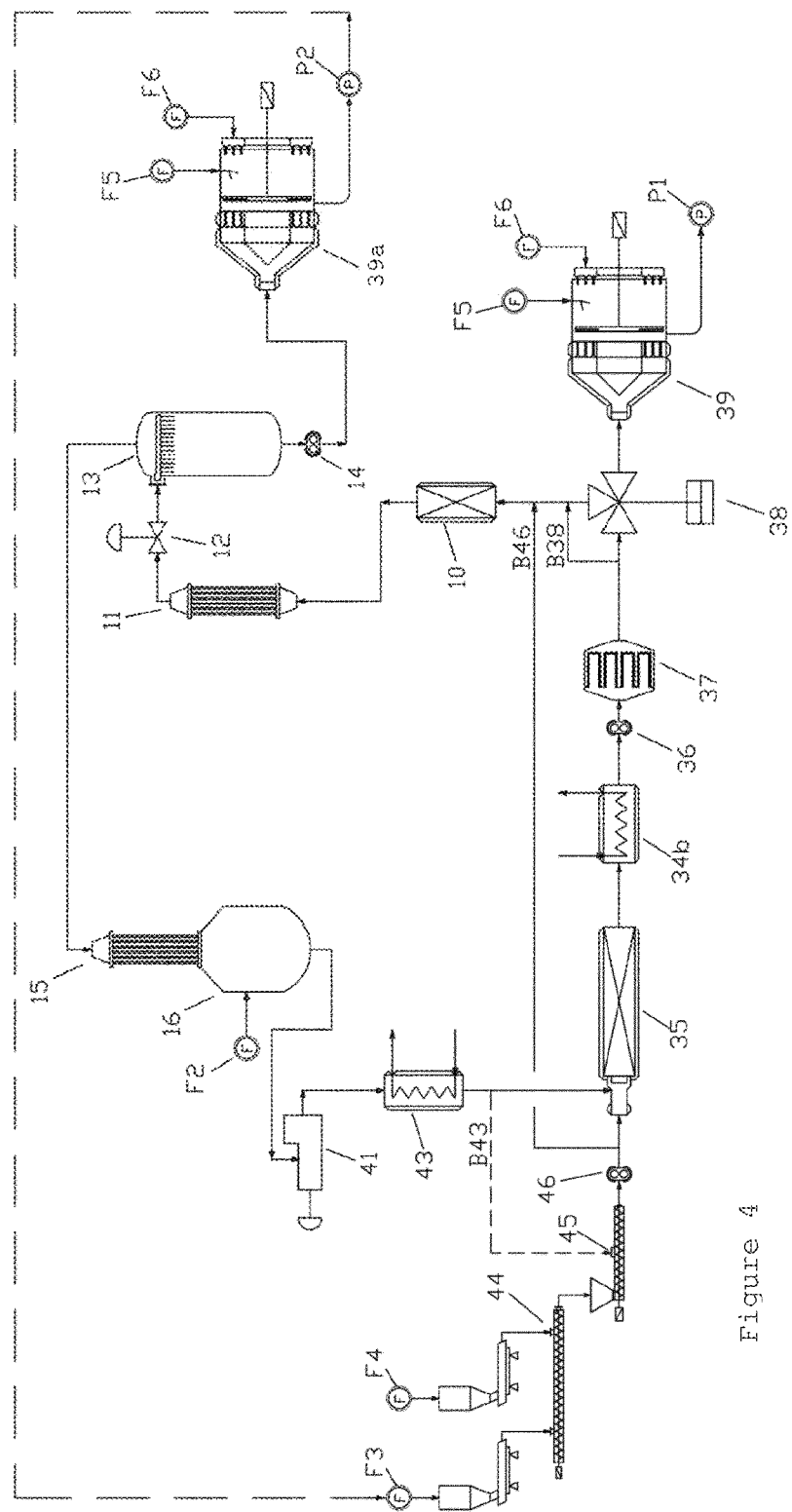
FIG. 4 shows a preferred embodiment of the process according to the present invention without an in-line production plant but with recycling of the non-expandable granulated polymer.

FIG. 4 illustrates a preferred embodiment according to the present invention. FIG. 4 describes a process for producing expandable granulates without an in-line polymer production plant and recycling of the non-expandable polymer.

For brevity, a description of the identical elements indicated previously in the embodiments described above is omitted.

In this case, the polymer (F3) used for the production of the expandable composition is supplied in the form of granules by one or more dedicated metering devices. A screw conveyor or an equivalent system (44) brings these materials to the extruder (45) for melting and optional mixing.

If the metering devices are successfully brought directly above the hopper of the extruder (45), the screw conveyor (44) is not necessary.

The expanding agent, instead of entering the static mixer (35), may be supplied directly to the extruder (45). In this case, the static mixer (35) may be eliminated, and the polymer may be pumped from (46) directly to (34b).

The polymer for flushing may be taken from the expandable composition by way of the bypass B38 described previously above, or by using a current (B46) drawn from the flow exiting the extruder (45) and pump (46), which does not contain expanding agent if the bypass B38 is not used.

The polymer free of expanding agent produced in the devolatilizer (13) is granulated by the granulator (39a). The product P2 thus obtained is sold as is or recycled into the process by way of a granulate metering device (flow F3).

Figure 5:
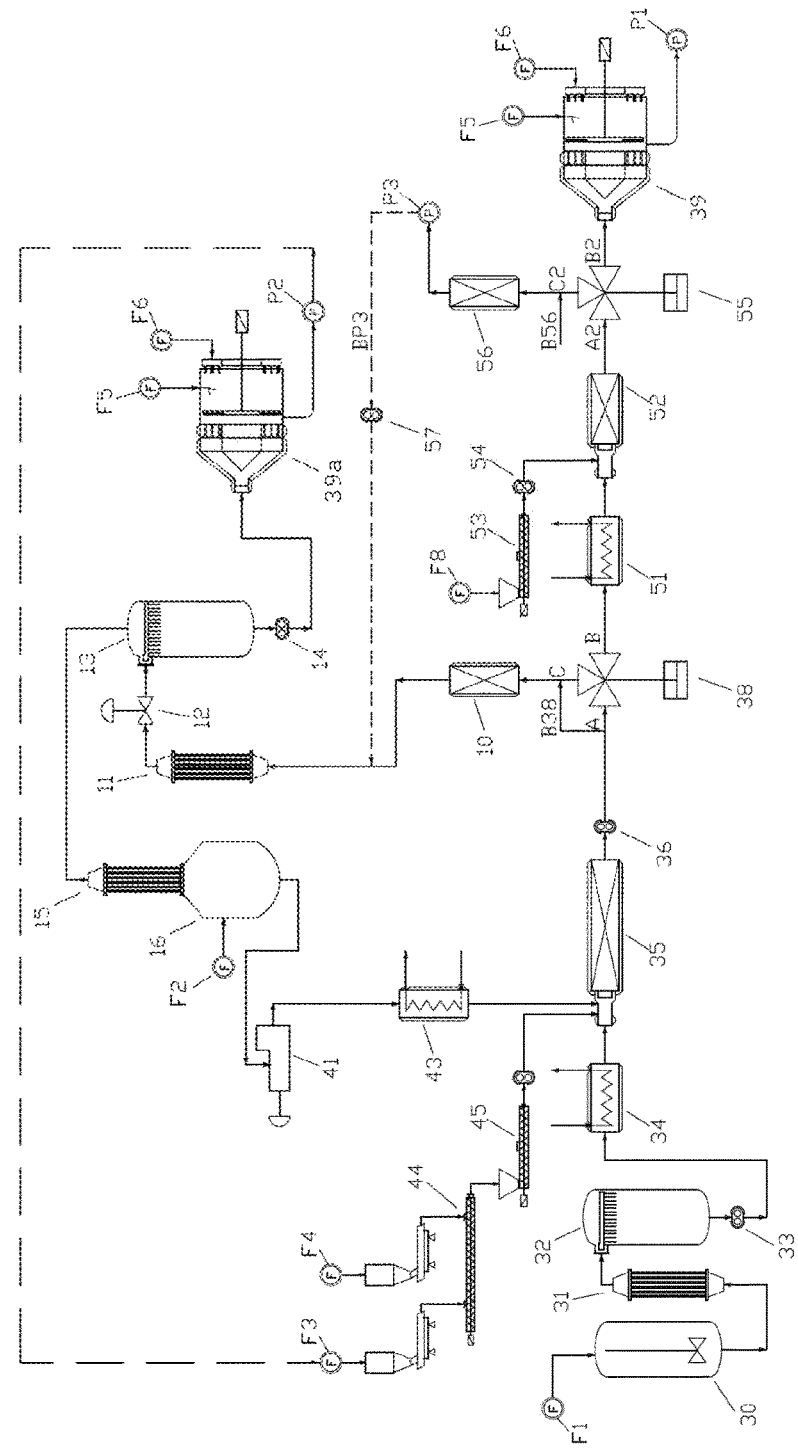
FIG. 5 shows a preferred embodiment of the process according to the invention without an in-line production plant but with recycling of the non-expandable polymer free of critical additives.

FIG. 5 illustrates a preferred embodiment according to the present invention. FIG. 5 describes a process for producing expandable granulates with recycling of the non-expandable polymer free of critical additives.

This embodiment is particularly advantageous where additives which are critical have to be used. In the present patent application, "critical additives" refers to thermally labile additives which decompose into other, generally undesirable additives if kept at high temperature for a prolonged time, or to additives which bring about degradation of the polymer if kept in contact therewith at high temperature for a prolonged time, or even to additives which are degraded when in contact with additives used in the process a for a prolonged time.

Examples of additives of this type are peroxides, such as 3,6,9-triethyl-3,6,9-trimethyl-1,4,7-triperoxponane or dicumyl peroxide, additives with a weak C—C bond, such as 2,3-dimethyl-2,3-diphenylbutane, which are sensitive to high temperatures and bring about degradation of the polymer, brominated compounds, which are typically used to confer flame-propagation-retardant properties, such as hexabromocyclododecane, tetrabromobisphenol A bis (allyl ether), and brominated polymers, such as brominated styrene-butadiene block copolymers.

In this embodiment, the polymer (F3) and the additives (F4), but not the critical additives, are supplied in the extruder (45). Therefore, in the mixer (35), the additives supplied in (F3) and (F4), the expanding agent (F2), and any polymer coming from the production plant (F1) are mixed, but not the critical additives. The additives and the polymer that are mixed in (35) are optionally pressurized by one or more booster pumps (36), which a person skilled in the art will insert along the route of the polymer where there is a need to raise the pressure of the molten polymer to counterbalance the pressure drop thereof.

During startup and shutdown of the expandable polymer granulation, the valve (38) is deviated into the Stand-by position (A→C). In this way, the cycle of the expanding agent and molten polymer is brought about in accordance with the mode of operation illustrated above.

Normally, the valve (38) deviates a molten expandable polymer mass that does not contain the critical additives. Therefore, the polymer flow cycle takes place without any risk of degradations occurring along the route of the removal of the expanding agent (10, 11, 12, 13, 14).

Indeed, it is found that if a significant amount of critical additives is also circulated, there is a progressive worsening in the quality of the polymer obtained (for example reduction in molecular weight). Further, unless the flow rate of polymer flushing towards position C of (38) is high, this brings about a high degradation polymer in (10, 11, 12, 13, 14), to such an extent that the polymer mass arriving at the granulator (39a) may be so degraded that it cannot be granulated.

The embodiment of FIG. 5 solves the problems discussed above.

In (F8), the critical additives are supplied to a dedicated extruder, together, if necessary, with a proportion of polymer or expandable polymer. In the extruder (53), a polymer melt is generated containing the critical additives, which are subsequently mixed into the remainder of the polymer mass in (52). Indeed, the aforementioned proportion of polymer or expandable polymer may be required for regulating the viscosity of the resulting melt in the extruder (53).

Advantageously, if the extruder is not capable of bringing the molten mixture to the pressure of the expandable polymer melt entering the mixer (52), it is possible to use a device for increasing the pressure (54), such as a gear pump. The liquid additives, such as phlegmatized peroxide solutions, may be supplied in (52) directly, and thus without passing through the extruder (53) or through the optional device for increasing the pressure (54).

If necessary, it is possible to use a heat exchanger (51) to regulate the temperature of the polymer arriving at (52). This exchanger may be placed both before and after the deviator valve (38).

In the present embodiment, the startup valve of the granulator is not the deviation valve (38). Therefore, if underwater or spray granulators are used, for the purging step in the die and the startup step it is necessary to deviate the polymer towards the depressurization device (56) This device has the same mode of operation and may be implemented using the same mode of operation as the depressurization device (10).

It is possible to recycle the molten product (P3) into the process in small doses. This may be implemented by pumping part of the product P3 towards the expanding agent removal system using the pump (57).

The system is possible inasmuch as the startup valve (55) is deviated into the Stand-by position only for the time necessary for bleeding the expandable polymer melt contained between the valves (38) and (55). Indeed, when the end device (39) is not active because it is in startup or in shutdown or because of another interruption, the valve (38) is also deviated into the Stand-by position (A→C). As a result, the valve (55) may be kept in the Stand-by position only for the period necessary to displace the polymer mass comprising the critical additives into (P3). Therefore, the volume of this polymer mass is reduced, and it can be recycled into the process in small doses.

The line between the position C2 of the valve (55) and the capacity in (P3) may expediently be flushed (B56) with fresh polymer coming from the devolatilizer (33) or with expandable polymer drawn from the delivery of the pump (36).

The invention claimed is:

1. A circuit for managing transients and process and product anomalies in a polymer granule or polymer extruded product production plant, the circuit comprising:
    a mixing device that mixes additives and expanding agents into a stream of molten polymer;
    a deviation valve that is suitable for molten polymers disposed downstream of the mixing device,
    wherein the deviation valve has an inlet that receives an output of the mixing device, a first outlet, and a second outlet,
    wherein the deviation valve is operable between at least a first position communicating the inlet and the first outlet and a second position communicating the inlet and the second outlet;
    a polymer granulator or an extrusion device disposed downstream of the deviation valve that receives an output of the first outlet;
    a heat exchanger disposed downstream of the deviation valve that receives an output of the second outlet;
    a devolatilizer disposed downstream of the heat exchanger that receives an output of the heat exchanger,
    wherein the devolatilizer is configured to physically separate the additives and expanding agents from the stream of the molten polymer; and
    a cooling device disposed downstream of the devolatilizer that receives the separated additives and expanding agents from the devolatilizer.

2. The circuit of claim 1, wherein the devolatilizer comprises a heating system.

3. The circuit of claim 2, wherein the heating system comprises a thermal jacket.

4. The circuit of claim 1, wherein the devolatilizer comprises a hydraulic guard.

5. The circuit of claim 1, wherein the cooling device is a condenser.

6. The circuit of claim 1, wherein the heat exchanger is configured to heat the molten polymer to a temperature of at least 160° C.

7. The circuit of claim 1, wherein the heat exchanger is configured to heat the molten polymer to a temperature of at most 230° C.

8. The circuit of claim 1, wherein the devolatilizer comprises a nozzle configured to allow non-condensable gas bleed.

9. The circuit of claim 1, wherein the cooling device comprises a nozzle configured to allow non-condensable gas bleed.

10. The circuit of claim 1, wherein the deviation valve is manually operable or regulated by a control system.

11. The circuit of claim 1, wherein the deviation valve comprises a buffer suitable for diverting a portion of the stream of molten polymer.

12. The circuit of claim 1, wherein the mixing device receives an output of the cooling device.

13. The circuit of claim 1, wherein the devolatilizer is configured to collect separated molten polymer that is substantially free of the expanding agents at a bottom of the devolatilizer.

14. The circuit of claim 13, wherein the mixing device receives the separated molten polymer that is substantially free of the expanding agents from the devolatilizer.

15. The circuit of claim 1, wherein the devolatilizer is configured to maintain a pressure in the devolatilizer at a level less than or equal to 5 absolute bar.

\* \* \* \* \*